United States Patent
Ooba (10) Patent No.: US 10,850,927 B2
(45) Date of Patent: Dec. 1, 2020

(54) WORK SYSTEM, METHOD FOR EXECUTING WORK ON OBJECT, AND ROBOT

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 16 days.

(21) Appl. No.: 16/106,366

(22) Filed: Aug. 21, 2018

(65) Prior Publication Data
US 2019/0112134 A1   Apr. 18, 2019

(30) Foreign Application Priority Data

Oct. 16, 2017   (JP) .................................. 2017-200233

(51) Int. Cl.
*B65G 43/08* (2006.01)
*G05B 19/418* (2006.01)
(Continued)

(52) U.S. Cl.
CPC ............ *B65G 43/08* (2013.01); *B25J 9/1687* (2013.01); *B25J 9/1697* (2013.01);
(Continued)

(58) Field of Classification Search
None
See application file for complete search history.

(56) References Cited

U.S. PATENT DOCUMENTS 6,463,360 B1 * 10/2002 Terada ................... B25J 9/1679
                                                                   318/568.12
2002/0175041 A1 * 11/2002 Moshgbar .............. B65G 43/08
                                                                   198/340
(Continued)

FOREIGN PATENT DOCUMENTS

AT               507339 B1      6/2011
DE       102006031178 A1      1/2007
(Continued)

OTHER PUBLICATIONS

Office Action dated Jul. 30, 2019, in corresponding Japanese Application No. 2017-200233; 8 pages.
(Continued)

*Primary Examiner* — Mohammad Ali
*Assistant Examiner* — David Earl Ogg
(74) *Attorney, Agent, or Firm* — Maier & Maier, PLLC (57) ABSTRACT

Provided is a work system including: a conveying apparatus that conveys an object; a moving platform that can be moved; a work portion that is secured to the moving platform and that performs work on the object being conveyed by the conveying apparatus; a visual sensor that is secured to the moving platform and that successively acquires visual information about the object being conveyed by the conveying apparatus or a mark formed on the conveying apparatus; a detecting portion that successively detects at least positions of the object or the mark by processing the visual information acquired by the visual sensor; a calculating portion that calculates a conveying velocity of the conveying apparatus on the basis of the positions of the object or the mark successively detected by the detecting portion; and a drive control unit that drives the work portion by using the conveying velocity.

7 Claims, 6 Drawing Sheets

(51) Int. Cl.
    *B25J 9/16*         (2006.01)
    *G06K 9/00*       (2006.01)
    *G06T 7/20*        (2017.01)

(52) U.S. Cl.
    CPC ..... *G05B 19/4182* (2013.01); *G06K 9/00671* (2013.01); *G06T 7/20* (2013.01)

(56) References Cited

U.S. PATENT DOCUMENTS

| | | | |
|---|---|---|---|
| 2007/0007924 A1* | 1/2007 | Nishihara | B25J 9/0093 318/560 |
| 2007/0179671 A1* | 8/2007 | Arimatsu | G05B 19/4182 700/247 |
| 2010/0094453 A1 | 4/2010 | Nishihara et al. | |
| 2012/0229620 A1 | 9/2012 | Ikeda et al. | |
| 2016/0031084 A1 | 2/2016 | Yamazaki | |
| 2016/0151916 A1 | 6/2016 | Kanno et al. | |
| 2017/0066133 A1 | 3/2017 | Ooba et al. | |
| 2017/0220032 A1 | 8/2017 | Ooba | |
| 2017/0341221 A1 | 11/2017 | Hashimoto et al. | |
| 2018/0370023 A1 | 12/2018 | Ooba | |
| 2019/0015973 A1 | 1/2019 | Ooba | |
| 2019/0047141 A1 | 2/2019 | Ooba | |

FOREIGN PATENT DOCUMENTS

| | | | |
|---|---|---|---|
| DE | 102013020135 A1 | | 6/2015 |
| DE | 102015015638 A1 | | 10/2016 |
| DE | 102016115987 A1 | | 3/2017 |
| EP | 2 497 611 A2 | | 9/2012 |
| EP | 2751748 B1 | * | 5/2019 |
| JP | H02-145291 | | 6/1990 |
| JP | H02-145291 A | | 6/1990 |
| JP | 2594423 B2 | * | 3/1997 |
| JP | H10-105217 A | | 4/1998 |
| JP | 11123677 A | * | 5/1999 |
| JP | 2001-121461 A | | 5/2001 |
| JP | 2002-014709 A | | 1/2002 |
| JP | 2009-028818 A | | 2/2009 |
| JP | 2009028818 A | * | 2/2009 |
| JP | 2010125583 A | * | 6/2010 |
| JP | 2013-180366 A | | 9/2013 |
| JP | 2016-032843 A | | 3/2016 |
| JP | 2016-107349 A | | 6/2016 |
| JP | 2016-129923 A | | 7/2016 |
| JP | 2017-134661 A | | 8/2017 |
| JP | 2019-005856 A | | 1/2019 |
| JP | 2009-028818 A | | 2/2019 |
| JP | 2019-018339 A | | 2/2019 |
| JP | 2019-030944 A | | 2/2019 |
| WO | 2016/103304 A1 | | 6/2016 |

OTHER PUBLICATIONS

Search Report dated Jul. 25, 2019, in corresponding Japanese Application No. 2017-200233; 42 pages.
Office Action dated Jun. 23, 2020 in corresponding German Application No. 10 2018 124 712.5; 11 pages Including English-language translation.
Office Action dated Oct. 13, 2020 in corresponding Japanese Application No. 2019-162934; 8 pages including English-language translation.

* cited by examiner

WORK SYSTEM, METHOD FOR EXECUTING WORK ON OBJECT, AND ROBOT

CROSS-REFERENCE TO RELATED APPLICATIONS

This application is based on Japanese Patent Application No. 2017-200233, the contents of which are incorporated herein by reference.

FIELD

The present invention relates to a work system, a method for executing work on an object, and a robot.

BACKGROUND

There is a known robot that performs various types of work on an object being conveyed on a conveying apparatus. As an example of such a robot, there is a robot that is mounted on a moving platform that can be moved, and that performs work on the object by recognizing the object by means of a camera attached to a distal end of a robot arm (for example, Japanese Unexamined Patent Applications, Publication No. 2001-121461 and Publication No. 2016-32843)

SUMMARY

The present invention provides the following solutions.

An aspect of the present invention provides a work system including: a conveying apparatus that conveys an object; a moving platform that can be moved; a work portion that is secured to the moving platform and that performs a work on the object being conveyed by the conveying apparatus; a visual sensor that is secured to the moving platform and that successively acquires visual information about the object being conveyed by the conveying apparatus or a mark formed on the conveying apparatus; a detecting portion that successively detects at least positions of the object or the mark by processing the visual information acquired by the visual sensor; a calculating portion that calculates a conveying velocity of the conveying apparatus on the basis of the positions of the object or the mark that are successively detected by the detecting portion; and a drive control unit that drives the work portion by using the conveying velocity.

In addition, another aspect of the present invention provides a work system including: a conveying apparatus that conveys an object; a moving platform that can be moved; a work portion that is secured to the moving platform and that performs work on the object being conveyed by the conveying apparatus; a visual sensor that successively acquires visual information of the object being conveyed by the conveying apparatus and that is secured to the moving platform so that an angle of view thereof includes a work are of the work portion; a detecting portion that successively detects at least positions of the object in the angle of view by processing the visual information acquired by the visual sensor; and a drive control unit that drives the work portion by using at least the position of the object successively detected by the detecting portion.

In addition, another aspect of the present invention provides a method for executing work on an object including: a step of disposing a moving platform to which a work portion and a visual sensor are secured in the vicinity of a conveying apparatus that conveys the object; a visual-information acquiring step of successively acquiring, by means of the visual sensor secured to the moving platform, visual information about the object being conveyed by the conveying apparatus or a mark formed on the conveying apparatus; a detecting step of successively detecting at least positions of the object or the mark by processing the visual information acquired by the visual sensor; a calculating step of calculating a conveying velocity of the conveying apparatus on the basis of the successively detected positions of the object and the mark; and a working step of performing, by using the conveying velocity, the work on the object being conveyed by the conveying apparatus by means of the work portion secured to the moving platform.

In addition, another aspect of the present invention provides a robot including: a conveying apparatus that conveys an object; a visual sensor that is secured to the moving platform, and that successively acquires visual information about the object being conveyed by the conveying apparatus or a mark formed on the conveying apparatus; a detecting portion that successively detects at least positions of the object or the mark by processing the visual information acquired by the visual sensor; a calculating portion that calculates a conveying velocity of the conveying apparatus on the basis of the positions of the object or the mark that are successively detected by the detecting portion; and a drive control unit that drives a work portion by using the conveying velocity.

DETAILED DESCRIPTION

A robot system (work system) 1 according to a first embodiment of the present invention will be described below with reference to the drawings.

Figure 1:
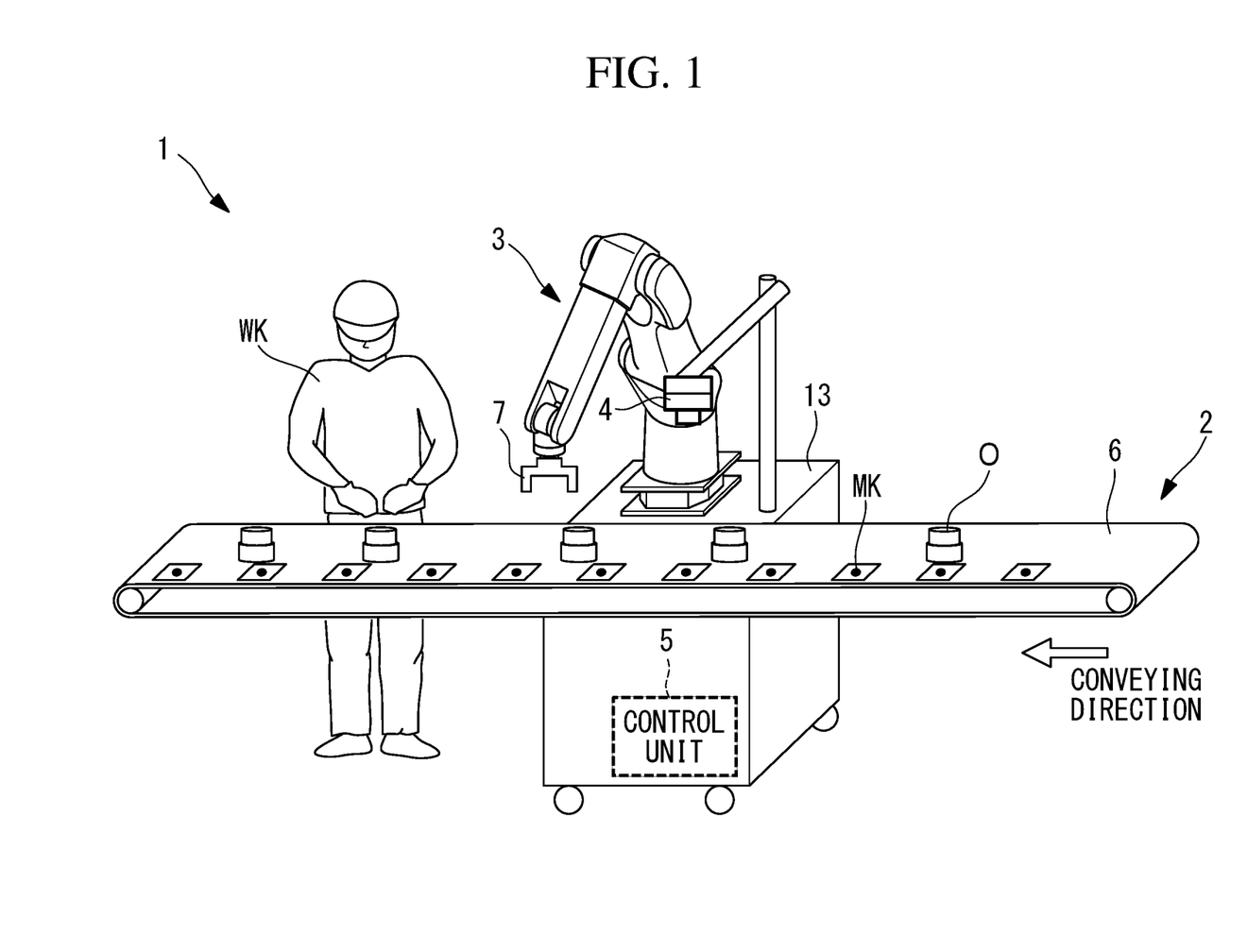
FIG. 1 is an overall configuration diagram showing a robot system according to a first embodiment of the present invention.

FIG. 1 shows the robot system 1 according to this embodiment including a production line for manufacturing an object O. The robot system 1 is provided with: a conveyor (conveying apparatus) 2 that conveys the object O; a moving platform 13 that is installed in the vicinity of the conveyor 2 and that can be moved; a camera (visual sensor) 4 that is secured above the moving platform 13 and that captures images of the object O being conveyed by the conveyor 2; a robot (work portion) 3 that is secured above the moving platform 13 and performs various types of work on the object O being conveyed by the conveyor 2; and a control unit 5 that controls the robot 3 and that also performs processing or the like of the images acquired by the camera 4. Furthermore, FIG. 1 shows, in addition to the robot system 1, a worker WK who performs the work on the object O.

The conveyor 2 is, for example, a belt conveyor, and is provided with a belt 6 on which the object O is placed and conveyed in one direction. The belt 6 is driven by a motor (not shown). On a surface of the belt 6, a plurality of marks MK are formed with predetermined spacings therebetween. Note that the descriptions are simplified in the following, whereby "on the belt 6" will also be referred to as "on the conveyor 2", and "the conveying velocity of the belt 6" will also be referred to as "the conveying velocity of the conveyor 2".

When the moving platform 13 is disposed in the vicinity of the conveyor 2 and secured thereto, as shown in FIG. 1, the camera 4 has a fixed viewing field in a certain region of the conveyor 2. The camera 4 successively acquires visual information in the form of two-dimensional images of the object O and marks MK being conveyed by the conveyor 2. In this embodiment, the camera 4 captures the images at a frame rate at which the images of the object O and marks MK are captured at least twice while that same object O and marks MK pass through the image-capturing viewing field of the camera 4.

Note that, the above-mentioned securing is achieved by, for example: a method in which rotation of some of or all of wheels of the moving platform 13 is restricted by wheel locking mechanisms that restrict the rotation of the wheels of the moving platform 13; a method in which, by moving the wheels of the moving platform 13 upward with respect to a body of the moving platform 13, the body is brought into contact with the ground, and, by doing so, the moving platform 13 is secured so as not to be moved with respect to the installation surface; and a method in which, by employing an outrigger structure provided with a plurality of arms that protrude in horizontal directions from both side surfaces of the body and a plurality of leg members that extend downward from each of the plurality of arms, the moving platform 13 is secured by using said outrigger structure. The moving platform 13 may be secured by using other methods.

On the moving platform 13, the robot 3 is installed farther on the downstream side in the conveying direction of the conveyor 2 than the camera 4 is. Accordingly, the robot 3 performs the work on the object O after the camera 4 captures the images thereof.

After the moving platform 13 is disposed in the vicinity of the conveyor 2 and is secured thereto, setting of a tracking coordinate system is performed by using the camera 4 and the robot 3.

As one method for setting the tracking coordinate system, first, by using the camera 4 of the secured moving platform 13, the images of the object O, the marks MK, calibration equipment, etc. (calibration equipment in this embodiment) on the conveyor 2 are acquired at a certain conveying position, and at least one image of the calibration equipment that has been conveyed by the conveyor 2 to a position that is farther downstream than the conveying position is also acquired. Next, the control unit 5 performs well-known image processing on these plurality of images, identifies, by means of pattern matching or the like, the direction in which the calibration equipment appearing in the plurality of images is moving, sets a horizontal direction corresponding to said moving direction to be, for example, the X-axis of the tracking coordinate system, and sets a horizontal direction that is orthogonal to the X-axis to be the Y-axis. The Z-axis may be set, as needed.

As another method, first, a calibration tool is attached to a distal end of the robot 3, and a calibration plate that has, on the top surface thereof, a plurality of small spots, which are disposed so as to be accurately arrayed in the direction that is orthogonal to the conveying direction, is placed on the conveyor 2. Here, the position of a distal end of the calibration tool is recognized by the control unit 5 that controls the robot 3.

Next, by bringing the distal end of the calibration tool attached to the distal end of the robot 3 into contact with at least two of the small spots arrayed on the top surface of the calibration plate in the conveying direction of the conveyor 2, the moving direction of the conveyor 2, in other words, the X-axis of the tracking coordinate system, is set in the control unit 5, and, by additionally bringing the distal end of the calibration tool into contact with at least one spot on the top surface of the calibration plate in the direction that is orthogonal to the X-axis, the Y-axis is set in the control unit 5. In addition, the direction that is orthogonal to the X- and Y-axes is set in the control unit 5 as the Z-axis, and a height obtained by subtracting the thickness of the calibration plate, which is known, from the contact position is set in the control unit 5 as the height of the conveyor 2. Note that, also in the case of the above-described method in which the camera 4 is used, it is possible to set the height by using contact with the robot 3, etc.

Note that the X-axis of the tracking coordinate system may be set by bringing the distal end of the calibration tool into contact with a spot on the calibration plate at a certain conveying position on the conveyor 2 and by bringing the distal end of the calibration tool into contact with the above-described spot on the calibration plate that has been conveyed to a position that is farther downstream than the conveying position is. In addition, the tracking coordinate system may be set by means of other methods.

As has been described above, the robot 3 and the camera 4 are secured above the moving platform 13, and the calibration of the robot 3 and camera 4 has already been performed, and thus, the positional relationship between the robot 3 and the camera 4 has been clarified. Accordingly, by setting the above-described tracking coordinate system by using the camera 4 or the robot 3, the tracking coordinate system in which the moving direction of the conveyor 2 serves as the X-axis is defined on the conveyor 2 with regard to the robot 3, and thus, the position of the camera 4 with respect to the tracking coordinate system is clarified. In other words, there is an advantage in that it is possible to install the camera 4 and the robot 3 for performing the work at the conveyor 2 without requiring complicated setting work. In this embodiment, a work area of the robot 3 is different from the image-capturing area of the camera 4. In other words, the work performed by the robot 3 is not captured by the camera 4.

The robot 3 of this embodiment is a vertical multi-joint robot having a plurality of joint shafts. Note that, in FIG. 1, illustrations of individual motors for driving the plurality of joint shafts and those of individual encoders for detecting rotational angles of the individual motors are omitted. At the distal end of the robot 3, a robot hand 7 for performing the work on the object O is attached.

Figure 2:
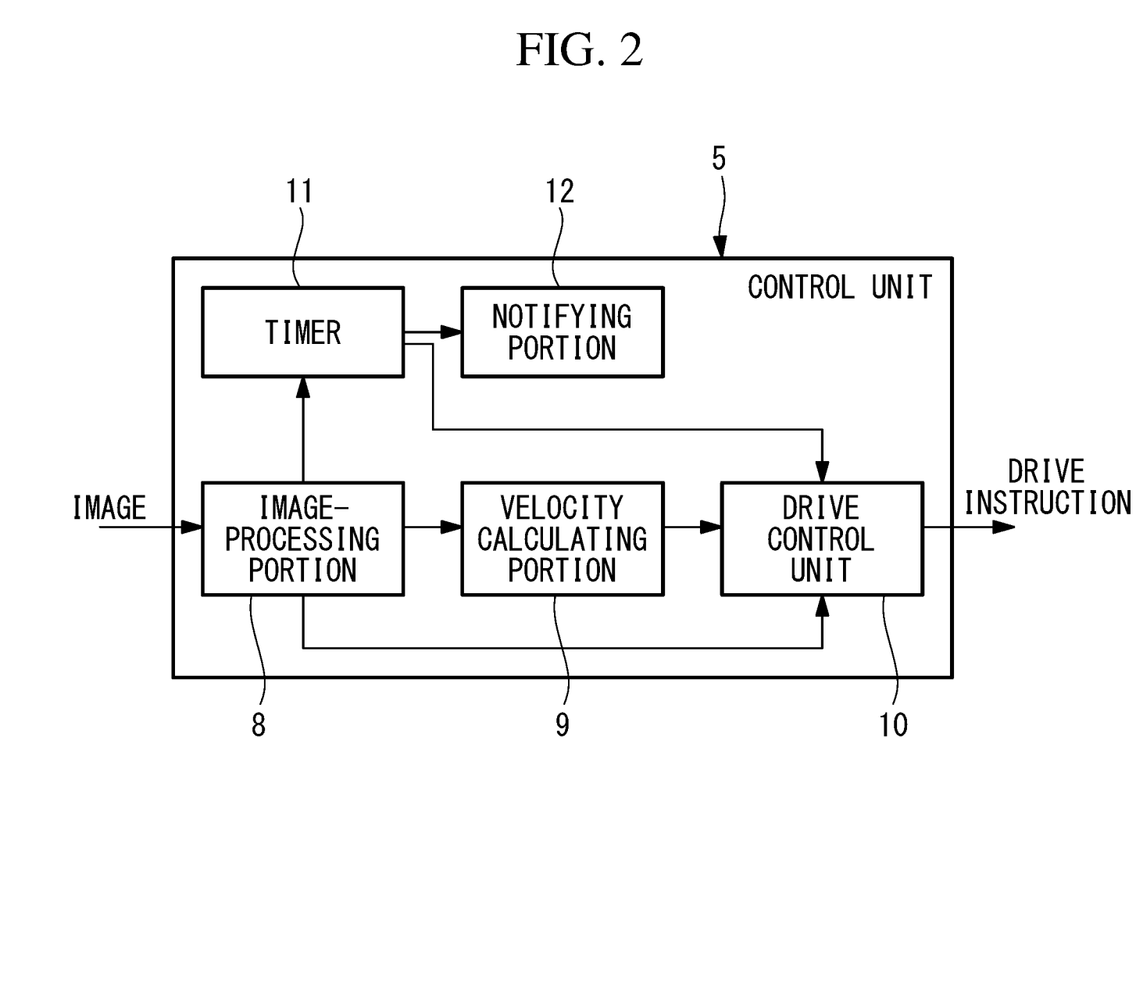
FIG. 2 is a block diagram showing a control unit provided in the robot system in FIG. 1.

The control unit 5 is constituted of a CPU, a ROM, a RAM, and a memory (not shown). As shown in FIG. 2, the control unit 5 is provided with: an image-processing portion 8 that processes the images acquired by the camera 4 and detects the objects O therein; a velocity calculating portion (calculating portion) 9 that calculates the conveying velocity of the conveyor 2 on the basis of the objects O in the processed images; a drive control unit 10 that drives the robot 3 on the basis of the conveying velocity calculated by the velocity calculating portion 9; a timer 11 that measures time; and a notifying portion 12 that externally issues a notification about predetermined information on the basis of the output from the timer 11. As shown in FIG. 1, in this embodiment, although the control unit 5 is built into the moving platform 13, in another embodiment, the control unit 5 may be separately provided from the moving platform 13.

The image-processing portion 8 detects and recognizes, in the images, the objects O being conveyed by the conveyor 2 or the marks MK formed on the conveyor 2 by applying pattern matching or the like to the images acquired by the camera 4. In addition, the image-processing portion 8 also detects the orientations of the recognized objects O or marks MK. The object O is placed still on the conveyor 2, and the marks MK are fixed on the conveyor 2. Because of this, when the conveyor 2 is in operation, the positions of the object O and marks MK with respect to the camera 4 change along the conveying direction.

The velocity calculating portion 9 calculates the conveying velocity of the conveyor 2 on the basis of changes, with respect to the position of the robot 3, in the positions of the same object O or the same mark MK detected by the image-processing portion 8. The velocity calculating portion 9 calculates the amount of movement of the object O being conveyed by the conveyor 2 by using the calculated conveying velocity of the conveyor 2. In the following, the case in which the object O is detected will be described.

Figure 3:
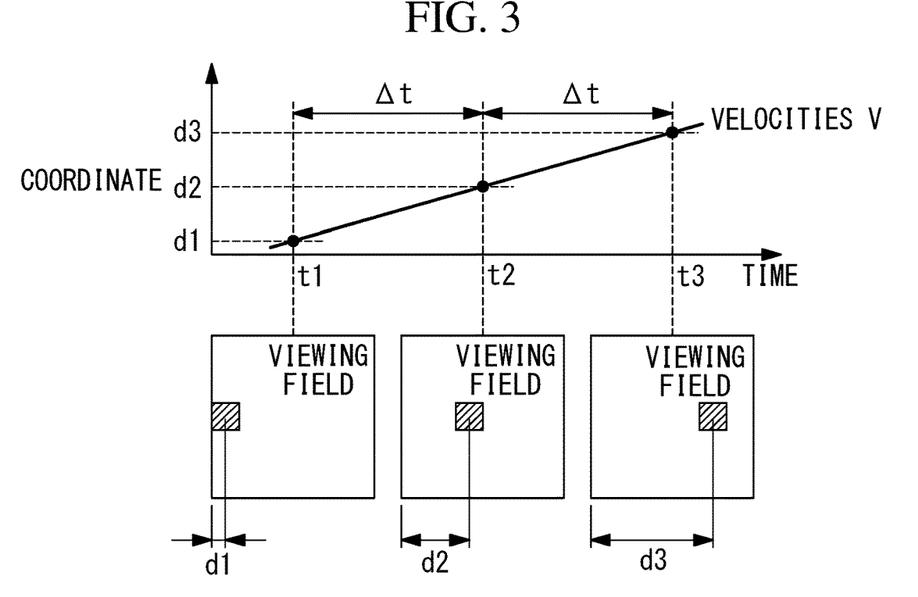
FIG. 3 is a diagram showing changes over time and conveying velocity of images acquired by a camera of the robot system in FIG. 1.

Specifically, for example, as shown in FIG. 3, when three images are acquired in the same viewing field at different times t1, t2, and t3 separated by a predetermined time interval $\Delta t$, the image-processing portion 8 recognizes, in the respective images, the objects O included in the images and calculates coordinate positions of the centers of gravity of the recognized objects O.

Also, the velocity calculating portion 9 recognizes, as the same object O, the objects O having the centers of gravity positioned in the vicinity of the same coordinates in a direction orthogonal to the conveying direction in the images acquired adjacent to each other in the time-axis direction, and calculates the conveying velocity by dividing the differences among the coordinate values of the centers of gravity of the respective objects O in the conveying direction by the time interval $\Delta t$ for capturing the images. When the conveying velocity is calculated multiple times for the same object O, the average thereof or a value fitted by means of the least squares method or the like is output as the conveying velocity.

Meanwhile, in this embodiment, the control unit 5 detects the positions and orientations of the respective objects O to control the robot 3 when causing the robot 3 to perform the work at a time interval $\Delta t_s$ that is greater than the predetermined time interval $\Delta t$. For example, in the case in which $\Delta t$ is several milliseconds, the positions and the orientations are detected at a time interval $\Delta t_s$ set to be several tens of times or several hundreds of times greater than $\Delta t$, that is, several hundreds of milliseconds. By doing so, the number of times the positions and orientations of the objects O are detected, which generally is time consuming in terms of data processing, is decreased, and thus, it is possible to reduce the processing load, thereby making it possible to stably perform calculations of the conveying velocity and amount of movement.

In addition, the image-processing portion 8 determines whether or not a situation in which no object O is detected in the images occurs. In the case in which an object O is not detected, the image-processing portion 8 causes the timer 11 to start a clock. In the case in which an object O is detected again in the images after causing the timer 11 to start the clock, the image-processing portion 8 causes the timer 11 to reset the clock.

When a predetermined amount of time has passed after the timer 11 started the clock, the notifying portion 12 externally issues a notification indicating that it is not possible to detect the object O. In such a case, in this embodiment, the notifying portion 12 issues any one of a notification indicating that conveying of the object O by the conveyor 2 is halted, a notification indicating that the belt 6 of the conveyor 2 is halted, and a notification indicating that a conveying velocity V of the belt 6 is temporarily not acquired. The notifying portion 12 issues such a notification by using an arbitrary means such as a monitor, a lamp, a buzzer, or the like. The notifying portion 12 issues a similar notification to the drive control unit 10 in the form of a control signal.

The drive control unit 10 drives the robot 3 by transmitting driving instructions to the robot 3 so as to control angles of the individual motors at the individual joint shafts of the robot 3 in accordance with an operating program taught thereto in advance. The drive control unit 10 performs feedback control on the individual motors by using the rotational angles of the individual motors detected by the individual encoders. On the basis of the conveying velocity V calculated by the velocity calculating portion 9, the drive control unit 10 executes tracking in which the object O on the conveyor 2 is followed. The drive control unit 10 loads the operating program in accordance with the work to be performed by the robot 3 and the model of the object O that serves as the work subject, and performs position setting of the tracking coordinate system or the like of the robot 3. As a result of the drive control unit 10 controlling the operations of the robot 3 and robot hand 7, the robot hand 7 performs various types of work on the object O being conveyed by the conveyor 2.

In this embodiment, upon receiving the notification from the notifying portion 12, the drive control unit 10 performs two types of control. One such control is control for stopping the work that the robot 3 performs on the object O. The other control is control for causing the robot 3 to continue the work by using the conveying velocity V of the conveyor 2 calculated by the velocity calculating portion 9 before the notifying portion 12 issues the notification.

By using the positions of the object O on the conveyor 2 detected by the image-processing portion 8, the conveying velocity V of the conveyor 2 calculated by the velocity calculating portion 9, and the amount of movement of the object O being conveyed, the drive control unit 10 causes the robot hand 7 to perform the work on the object O being conveyed while following the object O. Specifically, the drive control unit 10 causes the robot hand 7 to perform the work by reducing, as much as possible, relative velocities between the object O being conveyed and the robot hand 7. By doing so, it is possible to reduce the impact when the robot hand 7 comes into contact with the object O, which is effective in preventing breakage of the object O.

Figure 4:
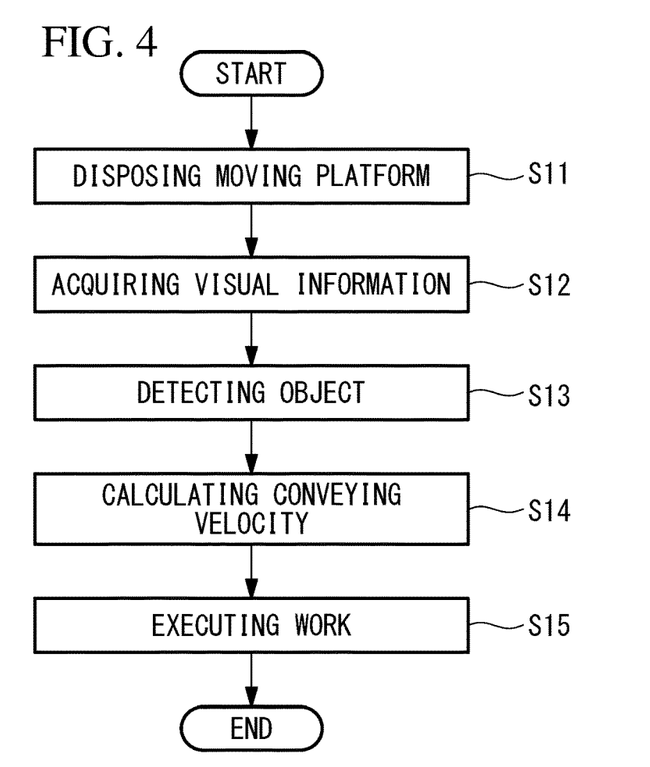
FIG. 4 is a flowchart of a method for executing work on an object O.

An example of a work execution method for performing procedures involved until the robot 3 performs the work on the object O being conveyed on the conveyor 2 will be described below in accordance with the flowchart shown in FIG. 4.

First, the moving platform 13 to which the robot 3 and the camera 4 are secured is disposed in the vicinity of the conveyor 2 and is secured thereto (step S11). The drive control unit 10 loads the operating program in accordance with the work to be performed by the robot 3 and the model of the object O that serves as the work subject, and performs the position setting of the tracking coordinate system or the like of the robot 3. The camera 4 captures, at the preset frame rate, images of the conveyor 2 including the object O being conveyed thereon, thus acquiring images that serve as the visual information (step S12). The image-processing portion 8 detects the objects O in the plurality of images acquired by the camera 4 (step S13). As shown in FIG. 3, the velocity calculating portion 9 calculates the conveying velocity V of the conveyor 2 by using the centers of gravity of the detected objects O (step S14). The drive control unit 10 calculates the current position and orientation of the object O on the conveyor 2 by using the conveying velocity V. The drive control unit 10 drives the robot 3 on the basis of the calculated position and orientation of the object O, and thus, the robot 3 performs the work on the object O on the conveyor 2 (step S15). Thus, the work execution method for the object O being conveyed by the conveyor 2 is completed.

The operation of the thus-configured robot system 1 according to this embodiment will be described below.

With the robot system 1 according to this embodiment, when the object O is being conveyed by the conveyor 2, the camera 4 captures the images of the object O. As a result of the images acquired by the image capturing being subjected to the image processing by the image-processing portion 8, the object O is detected in the images. On the basis of the detection result of the object O, the conveying velocity V of the conveyor 2 is calculated. While using the calculated conveying velocity V, the robot 3 performs work on the object O being conveyed by the conveyor 2.

Because the robot 3 and the camera 4 are secured to the moving platform 13, the robot 3 and the camera 4 can be moved in accordance with an increase/decrease in the number of objects O manufactured in the production line including the conveyor 2. Accordingly, as compared to a robot secured to the conveyor 2, there is an advantage in that these components do not cause overcapacity in the production line. Furthermore, in the robot system 1 of this embodiment, the conveying velocity V of the conveyor 2 is calculated on the basis of the images acquired by the camera 4, whose position is fixed with respect to that of the robot 3. Accordingly, an encoder or the like for calculating the conveying velocity V of the conveyor 2 is not necessary, and thus, there is an advantage in that it is possible to further suppress overcapacity in the production line including the conveyor 2.

Then, as shown in FIG. 3, on the basis of coordinate positions d1, d2, and d3 of the center of gravity of the same object O, which are calculated on the basis of the images acquired at different times t1, t2, and t3 separated by the predetermined time interval Δt, the conveying velocity V of the conveyor 2 is calculated by the velocity calculating portion 9 and is input to the drive control unit 10. Because the camera 4 and the robot 3 are disposed at positions that are separated by a predetermined distance, when the conveyor 2 is moving at the same velocity, the object O moves into an operating area of the robot 3 when the amount of time obtained by dividing this distance by the conveying velocity V has passed.

As described above, the drive control unit 10 recognizes the position and orientation of the object O with respect to a tracking coordinate system TF at one point in time (time interval $\Delta t_s$) at which the object O is present in the images, and calculates the amount of movement of the object O between said point in time and the current time. Then, a current tracking coordinate system TF' is calculated by multiplying the tracking coordinate system TF by a coordinate transformation matrix having said amounts of movement as components thereof.

$$TF'=T \cdot TF$$

Thus, with reference to the calculated current tracking coordinate system TF', the drive control unit 10 can cause the robot hand 7 to grip the object O and to pick up the object O from the conveyor 2 while causing the robot hand 7 to follow the object O being conveyed by the conveyor 2.

In this case, when the robot 3 is being driven so that the robot hand 7 follows the object O on the conveyor 2, because the camera 4 captures an image of the subsequent object O, and a new conveying velocity V is calculated by the velocity calculating portion 9, the drive control unit 10 can control the robot 3 by using the newly calculated conveying velocity V, and thus, it is possible to correctly pick up the object O even if the conveying velocity V of the conveyor 2 fluctuates.

Figure 5:
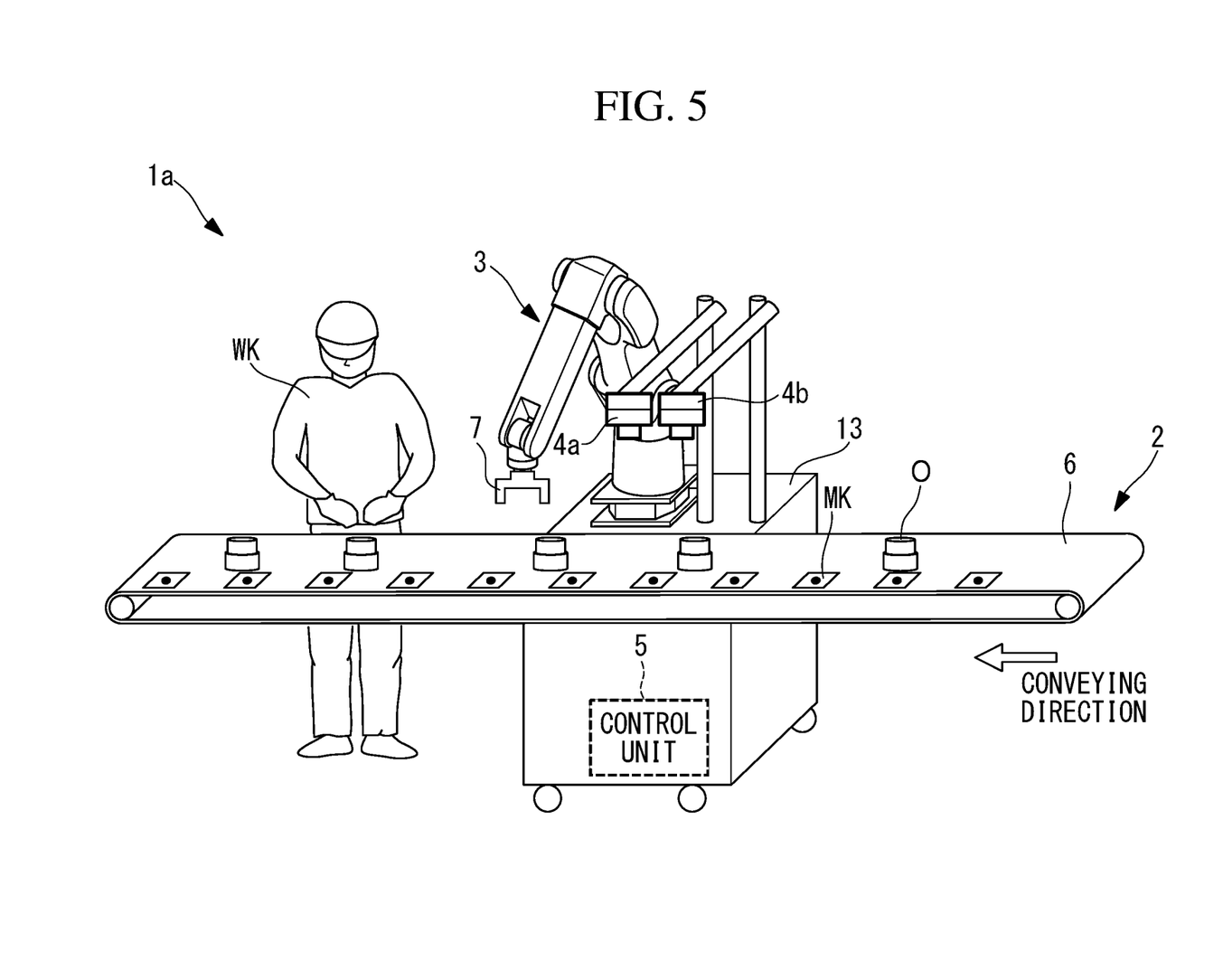
FIG. 5 is an overall configuration diagram showing a robot system according to a second embodiment.

FIG. 5 is an overall configuration diagram showing a robot system (work system) 1*a* according to a second embodiment. The robot system 1*a* of the second embodiment differs from the robot system 1 of the first embodiment in that a camera 4*a* and a camera 4*b* are provided instead of the camera 4 in the robot system 1 of embodiment 1. Because the robot system 1*a* has the same configurations as those of the robot system 1 of the first embodiment with respect to other features, the cameras 4*a* and 4*b* will be described in the second embodiment, and descriptions of the same configurations will be omitted.

In the second embodiment, the cameras 4*a* and 4*b* perform the tasks performed by the camera 4 in the first embodiment. Specifically, the conveying velocity V of the conveyor 2 is calculated on the basis of the images acquired by the camera 4*a*, and the position and the orientation of the object O being conveyed by the conveyor 2 are calculated on the basis of the images acquired by the camera 4*b*. In this way, by employing different image processing for the images from the camera 4*a* and the images from the camera 4*b*, the degrees of freedom with respect to design of the frame rate and the resolution of the cameras 4*a* and 4*b* are enhanced.

Figure 6:
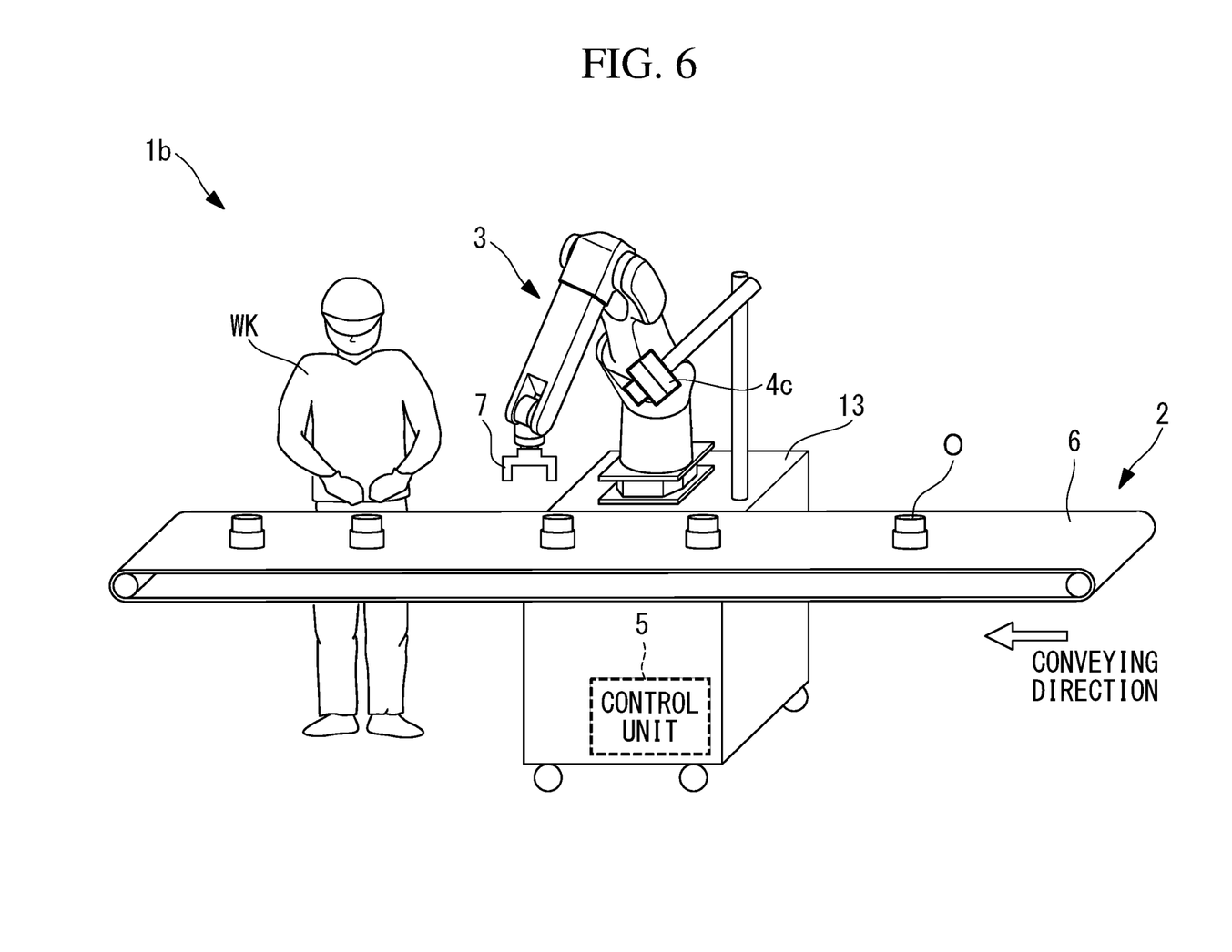
FIG. 6 is an overall configuration diagram showing a robot system according to a third embodiment.

FIG. 6 is an overall configuration diagram showing a robot system (work system) 1*b* according to a third embodiment. The robot system 1*b* of the third embodiment differs from the robot system 1 of the first embodiment in that a camera 4*c* that captures an area that is different from the image-capturing area of the camera 4 is provided instead of the camera 4 in the robot system 1 of the first embodiment. Because the robot system 1*b* has the same configurations as those of the robot system 1 of the first embodiment with respect to other features, the camera 4*c* will be described in the third embodiment, and descriptions of the same configurations will be omitted.

The image-capturing area (angle of view) of the camera 4*c* of the third embodiment includes the work area of the robot 3. The positions and the orientations of the objects O are successively calculated on the basis of the images acquired by the camera 4*c*.

The camera 4*c* may be a two-dimensional camera or a three-dimensional camera. In the case of a two-dimensional camera, setting of the tracking coordinate system, detection of the positions and orientations of the respective objects O, etc. are performed in similar manners as in the first embodiment by using the objects O in the plurality of images acquired by the camera 4*c*. Note that the robot system may be configured so that the calculation of the conveying velocity of the conveyor 2 and the calculation of the amount of movement of the object O are also performed in similar manners as in the first embodiment.

In the case in which a three-dimensional camera is used, because it is possible to three-dimensionally acquire, in real time, the position and orientation (inclination) of the object O with respect to the camera 4c, even if the object is tilted, it is possible for the robot 3 to perform the work on the object O on the basis of the detection results of the camera 4c.

As has been described above, because it is possible for the robot 3 to directly pick up the object O by using the detected position and orientation thereof as a result of the image-capturing area of the camera 4c overlapping with the work area of the robot 3, as compared to the case in which the image-capturing area of the camera 4c differs from the work area of the robot 3, the precision of the calculated position and orientation of the object O is increased, and it is also possible for the robot 3 to pick up the object O even if the position of the object changes somewhat before the robot 3 picks up the object O. Note that, because the interference in the viewing field of the camera 4c caused by the robot 3 is reduced when the direction (optical axis) of the camera 4c is tilted with respect to a horizontal surface (top surface of the conveyor 2) as in FIG. 6, this is advantageous in terms of enhancing the precision at which the position and orientation of the object O are detected. Accordingly, it is possible to modify, in various ways, the relationship between the work area of the robot 3 and the image-capturing area of the camera 4c.

Note that, although examples of the robot system 1 have been described in the above-described embodiments, it is possible to modify, in various ways, the robot system 1 and the robot that is disposed at the production line and secured thereto in a movable manner. For example, instead of the robot system 1 including the conveyor 2, it is permissible to employ a robot provided with: the moving platform 13 that is movable; the robot 3 that is secured to the moving platform 13 and that also performs the work on the object O being conveyed by the conveyor 2; and the camera 4 that is secured to the moving platform 13 and that also captures images of the object O.

The moving platform 13 may be an unmanned conveying vehicle (Automated Guided Vehicle). In this case, the moving platform 13 may be an unmanned conveying vehicle that employs an optical guidance system, an electromagnetic guidance system, or the like and that moves on a predetermined pathway in a factory having a plurality of conveyors 2. As a result of the moving platform 13 moving on the predetermined pathway, a robot that would cause overcapacity is prevented from being set in place.

In another embodiment of the robot system, a plurality of robots 3 including the built-in control units 5 as in the above-described embodiment may be disposed at a single conveyor 2 and secured thereto, and a cell control apparatus that controls the plurality of robots 3 may be provided. This cell control apparatus is a higher-level control apparatus of the plurality of control units 5, and controls the plurality of robots 3 and the cameras 4 that are individually secured to the plurality of moving platforms 13. In this case, when one of the cameras 4 included in the plurality of robots 3 acquires the images of the object O or the marks MK being conveyed by the conveyor 2, the cell control apparatus calculates, by using the acquired images, the conveying velocity V of the conveyor 2 and the position and the orientation of the object O. The cell control apparatus may share the calculated conveying velocity V of the conveyor 2 and the calculated position and orientation of the object O with the plurality of robots 3 that are under the control of the cell control apparatus.

The drive control unit 10 may cause the robot 3 to be moved outside the work area when other objects differing from the object O serving as the work subject are conveyed by the conveyor 2. For example, when the image-processing portion 8 detects the other objects in the images acquired by the camera 4, the drive control unit 10 causes the robot hand 7 to be moved outside the work area. By doing so, it is possible to prevent an accident on the conveyor 2 by avoiding collisions between the robot 3 and the other objects.

Figure 7:
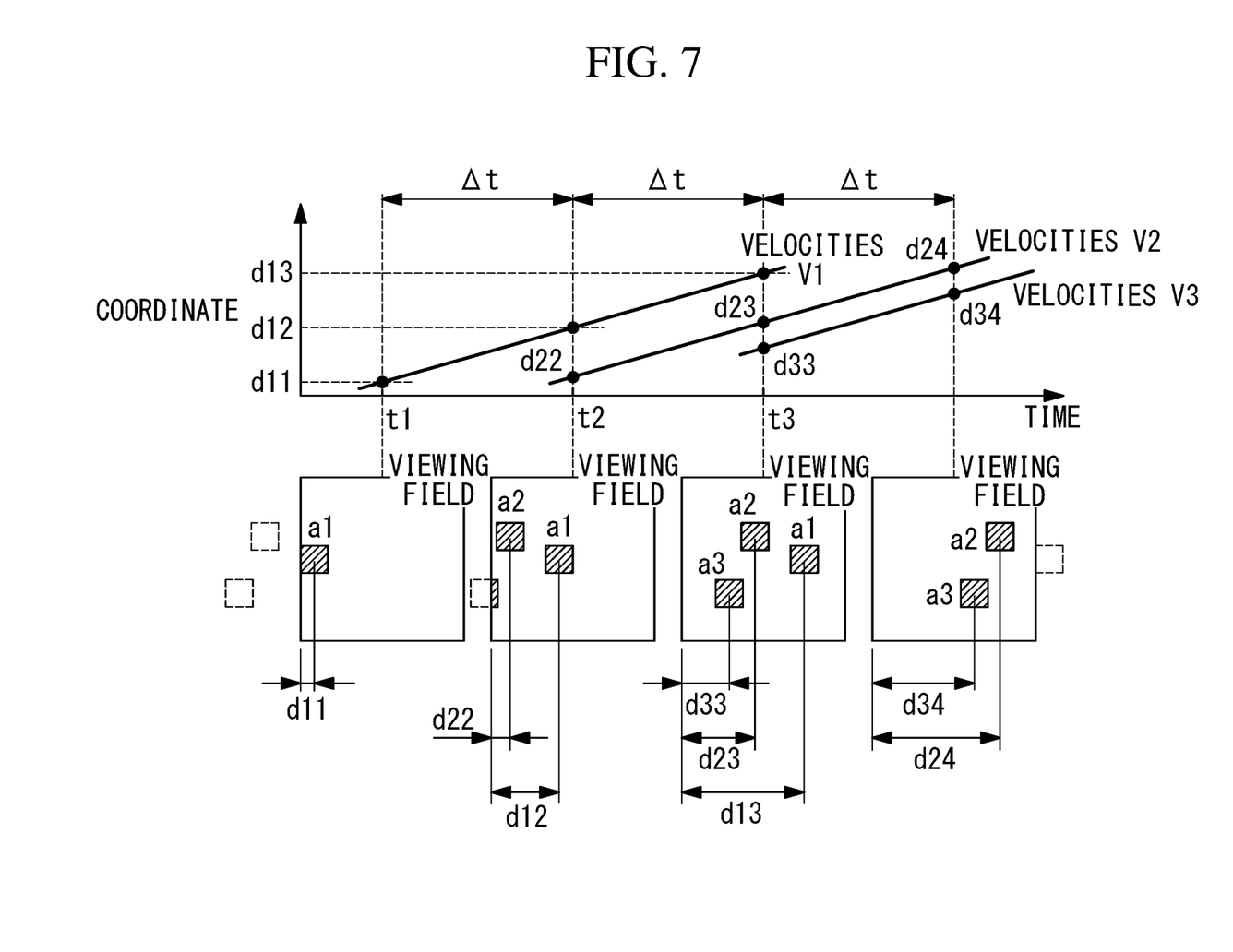
FIG. 7 is a diagram similar to FIG. 3 showing a case in which images of a plurality of objects in the same viewing field are captured in the robot system in FIG. 1.

In addition, in this embodiment, although the case in which the single object O is detected in the images has been described, alternatively, as shown in FIG. 7, it is possible to apply the present invention to a case in which a plurality of objects a1, a2, and a3 are simultaneously placed in the viewing field of the camera 4.

In other words, in the case in which the plurality of objects a1, a2, and a3 are recognized in the images, for the respective objects a1, a2, and a3, the sameness with respect to the objects a1, a2, and a3 in the images acquired at different times may be determined, and the conveying velocity V may be calculated by averaging velocities V1, V2, and V3 separately calculated on the basis of the movement distances among the objects a1, a2, and a3 determined to be the same. In this case, the movement distances of the same objects a1, a2, and a3 are determined, respectively, on the basis of differences in coordinate positions d11, d12, and d13, coordinate positions d22, d23, and d24, and coordinate positions d33 and d34 of the centers of gravity of the same objects a1, a2, and a3, which are calculated on the basis of the images acquired at different times t1, t2, and t3 separated by the predetermined time interval Δt.

With the robot system 1 of the above-described embodiments, although the conveying velocity V of the conveyor 2 is calculated on the basis of the position of the object O being conveyed by the conveyor 2, the conveying velocity V of the conveyor 2 may be calculated as a result of the camera 4 capturing images of the marks MK formed on the conveyor 2. As the marks MK, marks in which multiple types of shapes, such as a rectangle, a circle, etc. are combined may be employed. Regarding the positions at which the marks MK are disposed, because the camera 4 is secured to the moving platform 13 that can be moved, the marks MK may be disposed in the direction along the conveying direction and the direction that is orthogonal to the conveying direction with predetermined spacings therebetween, or the marks MK may be randomly disposed.

In the above-described embodiments, although the robot 3 secured to the moving platform 13 is a vertical multi-joint robot, it is possible to modify, in various ways, the robot that performs the work on the object O being conveyed by the conveyor 2. For example, the robot 3 may be a horizontally installed type, a suspended type, etc., a simple work apparatus provided with a tray and a mechanism that places the object O on the tray, and it suffices to employ an arbitrary work apparatus (work portion).

In the above-described embodiments, although work involving picking up the object O from the conveyor 2 has been described as example work that robot hand 7 performs on the object O, it is possible to modify the work to be performed in various ways. For example, the robot hand 7 may perform work in which some part is welded without moving the object O on the conveyor 2.

From the above-described embodiments and modifications thereof, the following aspects of the invention are derived.

An aspect of the present invention provides a work system including: a conveying apparatus that conveys an object; a moving platform that can be moved; a work portion that is secured to the moving platform and that performs a work on the object being conveyed by the conveying apparatus; a visual sensor that is secured to the moving platform and that successively acquires visual information about the object being conveyed by the conveying apparatus or a mark formed on the conveying apparatus; a detecting portion that successively detects at least positions of the object or the mark by processing the visual information acquired by the visual sensor; a calculating portion that calculates a conveying velocity of the conveying apparatus on the basis of the positions of the object or the mark that are successively detected by the detecting portion; and a drive control unit that drives the work portion by using the conveying velocity.

With this aspect, the visual sensor such as a camera or the like successively acquires the visual information about the object being conveyed by the conveying apparatus or the mark formed on the conveying apparatus. The calculating portion calculates the conveying velocity of the conveying apparatus on the basis of changes in at least the positions of the plurality of objects or marks included in the successively acquired visual information. The drive control unit specifies the position of an object being conveyed by the conveying apparatus by using the conveying velocity and causes the work portion to perform the work on the specified object.

In other words, with this aspect, by moving the moving platform, the necessary numbers of robots are disposed in the production line including the conveying apparatus. The visual sensor and the work portion are secured to the moving platform, and thus, the position of the visual sensor with respect to the work portion does not change even if the moving platform is moved. Accordingly, by using the calculated conveying velocity of the conveying apparatus, the work portion performs the work on the object being conveyed on the conveying apparatus without needing a pulse coder or that like that causes overcapacity.

In the above-described aspect, in the case in which the object or the mark is not detected in a plurality of the visual information acquired by the visual sensor in a predetermined period, the drive control unit may drive the work portion by using the conveying velocity calculated by the calculating portion before the predetermined period.

By doing so, even if there is a time in which the object or the mark is not detected by the visual sensor, it is possible to continue to perform the work performed by the work portion on the object being conveyed by the conveying apparatus farther downstream of the angle of view of the visual sensor.

In the above-described aspect, the calculating portion may calculate an amount of movement of the object being conveyed on the conveying apparatus on the basis of the calculated conveying velocity, and, by using the position of the object detected by the detecting portion, and the amount of movement of the object and the conveying velocity calculated by the calculating portion, the drive control unit may drive the work portion so as to perform the work on the object while following the object being conveyed by the conveying apparatus.

By doing so, because the impact that occurs at the time when the object being conveyed by the conveying apparatus and the work portion into contact with each other, damages or the like on the object while performing the work is avoided or prevented.

The above-described aspect may further include a notifying portion that, in the case in which the object or the mark is not detected in the plurality of the visual information acquired by the visual sensor in a predetermined period, issues a notification indicating that conveying of the object on the conveying apparatus is halted or that the conveying apparatus is halted.

In the case in which the object or the mark is not detected in the visual information, it is conceivable that the conveying velocity of the conveying apparatus is zero or the object serving as the work subject is not being conveyed. In this case, issuing of the notification by the notifying portion prevents an accident and prevents an unnecessary work.

In the above-described aspect, in the case in which the notifying portion issues the notification, the drive control unit may stop the work that the work portion performs on the object.

Doing so prevents an accident and prevents an unnecessary work.

In the above-described aspect, the calculating portion may calculate, as the conveying velocity, an average of velocities of a plurality of the objects or an average of a plurality of the marks.

Even in the case in which images captured by a camera or the like are used as the visual information of the visual sensor and, for example, aberration of a lens thereof has greater influences in the periphery of the angle of view than in the enter thereof, by using an average of velocities of the plurality of objects or marks captured by the camera as the conveying velocity of the conveying apparatus, the conveying velocity of the conveying apparatus is more precisely calculated.

In addition, another aspect of the present invention provides a work system including: a conveying apparatus that conveys an object; a moving platform that can be moved; a work portion that is secured to the moving platform and that performs work on the object being conveyed by the conveying apparatus; a visual sensor that successively acquires visual information of the object being conveyed by the conveying apparatus and that is secured to the moving platform so that an angle of view thereof includes a work are of the work portion; a detecting portion that successively detects at least positions of the object in the angle of view by processing the visual information acquired by the visual sensor; and a drive control unit that drives the work portion by using at least the position of the object successively detected by the detecting portion.

With this aspect, the visual sensor such as a camera or the like successively acquires the visual information about the object being conveyed by the conveying apparatus. The detecting portion successively detects at least the positions of the object in the angle of view of the visual sensor by processing the visual information acquired by the visual sensor. The drive control unit causes the work portion to perform the work on the object by using the positions of the object successively detected by the detecting portion.

In other words, with this aspect, by moving the moving platform, the necessary numbers of robots are disposed in the production line including the conveying apparatus. The visual sensor and the work portion are secured to the moving platform, and thus, the position of the visual sensor with respect to the work portion does not change even if the moving platform is moved. Accordingly, by using the positions of the object successively detected by the detecting portion, it is possible for the work portion to perform the work on the object being conveyed on the conveying apparatus.

In addition, another aspect of the present invention provides a method for executing work on an object including: a step of disposing a moving platform to which a work portion and a visual sensor are secured in the vicinity of a conveying apparatus that conveys the object; a visual-information acquiring step of successively acquiring, by means of the visual sensor secured to the moving platform, visual information about the object being conveyed by the conveying apparatus or a mark formed on the conveying apparatus; a detecting step of successively detecting at least positions of the object or the mark by processing the visual information acquired by the visual sensor; a calculating step of calculating a conveying velocity of the conveying apparatus on the basis of the successively detected positions of the object and the mark; and a working step of performing, by using the conveying velocity, the work on the object being conveyed by the conveying apparatus by means of the work portion secured to the moving platform.

In addition, another aspect of the present invention provides a robot including: a conveying apparatus that conveys an object; a visual sensor that is secured to the moving platform, and that successively acquires visual information about the object being conveyed by the conveying apparatus or a mark formed on the conveying apparatus; a detecting portion that successively detects at least positions of the object or the mark by processing the visual information acquired by the visual sensor; a calculating portion that calculates a conveying velocity of the conveying apparatus on the basis of the positions of the object or the mark that are successively detected by the detecting portion; and a drive control unit that drives a work portion by using the conveying velocity.

Advantageous Effects of Invention

The present invention affords an advantage in that it is possible to easily cope with an increase/decrease in the number of products to be manufactured depending on production periods.

REFERENCE SIGNS LIST 1, 1a, 1b robot system (work system)
2 conveyor (conveying apparatus)
3 robot (work portion)
4, 4a, 4b, 4c camera (visual sensor)
8 image-processing portion (detecting portion)
9 velocity calculating portion (calculating portion)
10 drive control unit
12 notifying portion
13 moving platform
a1, a2, a3 O object
MK mark
V conveying velocity
S11 disposing step
S12 visual-information acquiring step
S13 detecting step
S14 calculating step
S15 working step

The invention claimed is:
1. A work system comprising:
a conveying apparatus that conveys an object;
a moving platform that can be moved;
a work portion that is secured to the moving platform and that performs work on the object being conveyed by the conveying apparatus;
a visual sensor that is secured to the moving platform and that successively acquires visual information about the object being conveyed by the conveying apparatus or a mark formed on the conveying apparatus;
a detecting portion that successively detects at least positions of the object or the mark by processing the visual information acquired by the visual sensor;
a calculating portion that calculates a conveying velocity of the conveying apparatus on a basis of the positions of the object or the mark that are successively detected by the detecting portion; and
a drive control unit that drives the work portion by using the conveying velocity,
wherein an image-capturing area of the visual sensor is located at an upstream side of the conveying apparatus relative to a work area where the work is conducted by the work portion, and the work area is not captured by the visual sensor,
wherein, in the case in which the object or the mark is not detected in a plurality of the visual information acquired by the visual sensor in a predetermined period, the drive control unit drives the work portion by using the conveying velocity calculated by the calculating portion before the predetermined period.

2. The work system according to claim 1,
wherein the calculating portion calculates an amount of movement of the object being conveyed on the conveying apparatus on a basis of the calculated conveying velocity, and,
by using the position of the object detected by the detecting portion, and the amount of movement of the object and the conveying velocity calculated by the calculating portion, the drive control unit drives the work portion so as to perform the work on the object while following the object being conveyed by the conveying apparatus.

3. The work system according to claim 1, further comprising:
a notifying portion that, in the case in which the object or the mark is not detected in a plurality of the visual information acquired by the visual sensor in a predetermined period, issues a notification indicating that conveying of the object on the conveying apparatus is halted or that the conveying apparatus is halted.

4. The work system according to claim 3, wherein, in the case in which the notifying portion issues the notification, the drive control unit stops the work that the work portion performs on the object.

5. The work system according to claim 1, wherein the calculating portion calculates, as the conveying velocity, an average of velocities of a plurality of the objects or an average of a plurality of the marks.

6. A method for executing work on an object comprising:
disposing a moving platform to which a work portion and a visual sensor are secured;
successively acquiring, by the visual sensor secured to the moving platform, visual information about the object being conveyed by the conveying apparatus or a mark formed on the conveying apparatus;
successively detecting at least positions of the object or the mark by processing the visual information acquired by the visual sensor;

calculating a conveying velocity of the conveying apparatus on a basis of the successively detected positions of the object or the mark; and performing, by using the conveying velocity, the work on the object being conveyed by the conveying apparatus by the work portion secured to the moving platform, wherein an image-capturing area of the visual sensor is located at an upstream side of the conveying apparatus relative to a work area where the work is conducted by the work portion, and the work area is not captured by the visual sensor, wherein, in the case in which the object or the mark is not detected in a plurality of the visual information acquired by the visual sensor in a predetermined period, the drive control unit drives the work portion by using the conveying velocity calculated by the calculating portion before the predetermined period.

7. A robot comprising:

a conveying apparatus that conveys an object;

a visual sensor that is secured to a moving platform and that successively acquires visual information about the object being conveyed by the conveying apparatus or a mark formed on the conveying apparatus;

a detecting portion that successively detects at least positions of the object or the mark by processing the visual information acquired by the visual sensor;

a calculating portion that calculates a conveying velocity of the conveying apparatus on a basis of the positions of the object or the mark that are successively detected by the detecting portion; and a drive control unit that drives a work portion by using the conveying velocity, wherein an image-capturing area of the visual sensor is located at an upstream side of the conveying apparatus relative to a work area where work is conducted by the work portion, and the work area is not captured by the visual sensor, wherein, in the case in which the object or the mark is not detected in a plurality of the visual information acquired by the visual sensor in a predetermined period, the drive control unit drives the work portion by using the conveying velocity calculated by the calculating portion before the predetermined period.

* * * * *